United States Patent [19]

Saburi

[11] Patent Number: 4,715,033

[45] Date of Patent: Dec. 22, 1987

[54] STATE INFORMATION COMMUNICATION IN A TDMA SATELLITE COMMUNICATION NETWORK WITH HIGH FRAME AVAILABILITY

[75] Inventor: Akio Saburi, Tokyo, Japan

[73] Assignee: NEC Corporation, Japan

[21] Appl. No.: 733,714

[22] Filed: May 13, 1985

[30] Foreign Application Priority Data

May 14, 1984 [JP] Japan ............................. 59-96147

[51] Int. Cl.$^4$ ..................... H04Q 11/04; H04J 3/06
[52] U.S. Cl. ................................................ 370/104
[58] Field of Search ................. 370/60, 94, 104, 95; 11/11; 340/825.5

[56] References Cited

U.S. PATENT DOCUMENTS

| 4,455,651 | 6/1984 | Baran | 370/104 |
| 4,574,378 | 3/1986 | Kobayashi | 370/104 |
| 4,574,379 | 3/1986 | Eng et al. | 370/104 |
| 4,577,316 | 3/1986 | Schiff | 370/104 |

Primary Examiner—Douglas W. Olms
Assistant Examiner—Curtis Kuntz
Attorney, Agent, or Firm—Laff, Whitesel, Conte & Saret

[57] ABSTRACT

In each terrestrial station (12), a collecting circuit (97) collects those state information signals as a collected signal which represent states of operation of communication devices (94, 95). A state information signal sending device (101) sends the collected signal in a state information time slot which is predetermined in a TDMA frame outwardly of a standard/synchronization burst part and a data burst part for a standard earth station (10) and all terrestrial stations. The state information time slot is selected in different TDMA frames by the terrestrial stations. A central supervise/control apparatus (40) accompanying the standard earth station monitors the terrestrial station in response to the collected signals extracted from the respective TDMA frames. An alarm signal sending device (115) may send an alarm signal representative of an extraordinary state of operation in a synchronization burst of the terrestrial station in question. In this event, the standard earth station prevents other terrestrial stations from sending their respective collected signals during a predetermined time duration.

11 Claims, 6 Drawing Figures

STATE INFORMATION COMMUNICATION IN A TDMA SATELLITE COMMUNICATION NETWORK WITH HIGH FRAME AVAILABILITY

BACKGROUND OF THE INVENTION

This invention relates to a state information communicating system which is for use in a TDMA (time division multiple access) satellite communication network.

It is a recent trend that a TDMA satellite communication network is widely applied to various communications, such as a domestic communication, a business communication, and the like. The satellite communication network comprises a plurality of terrestrial or earth stations and at least one standard earth station. The standard earth station is for periodically generating standard bursts. Each standard burst defines a TDMA frame consisting of each standard burst and a remaining part. The remaining part comprises a first and a second part. The first part is for data bursts produced by the terrestrial stations and the standard earth station. Each of the data bursts includes a traffic data to be communicated. The second part is a remaining part of each frame.

In the TDMA satellite communication network, each of the terrestrial stations is a nonattendant station in general. Therefore, it is general that supervision of the terrestrial stations is remotely and automatically carried out at the standard earth station. For this purpose, each terrestrial station sends a set of state information signals which are representative of the states of operation of the terrestrial station under consideration. The "states of operation" must be monitored to detect, for example, indications of alarm conditions relating to communication devices and associated equipment, selection status of redundant equipments, data collected by built-in test capability, room temperature, maintenance condition, and the like.

In a conventional state information communicating system which will later be exemplified more in detail, such a set of state information signals are sent from the respective terrestrial stations by the use of state information time slots of the TDMA frame. The state information time slots are specific to the respective terrestrial stations and are assigned thereto, all in a part of the second part.

In each TDMA frame, a standard burst time slot for the standard burst and the state information time slots do not carry any traffic data. In view of this fact, it is possible to define as regards each TDMA frame a ratio of a total time slot used for traffic data to the TDMA frame. The ratio may define a frame availability. It is desirable that the frame availability is as high as 95% or 98%.

The conventional state information communicating system is unsuitable to achieve such a high frame availability. This is because the state information time slots are included in each TDMA frame for the respective terrestrial stations.

In order to achieve a high frame availability, it is desirable to shorten the state information time slots in each TDMA frame. To this end, it may be considered that each terrestrial station divides the state information signals into many divisions and sends the divisions by the use of narrow state information time slots in a plurality of TDMA frames, respectively. It should be noted that each of the state information signals, which is representative of each state of operation, is not necessarily composed of a single bit, but may also be composed of several bits. This means that each division itself cannot completely include each state information signal and therefore may not have significant meaning. In this case, the standard earth station has to receive and collect all of the divisions for each terrestrial station and to assemble the divisions into significant words, each of which is representative of at least one state of operation. Therefore, the standard earth station needs a complicated processing device in order to assemble the divisions.

SUMMARY OF THE INVENTION

It is therefore an object of this invention to provide a state information communicating arrangement for use in a terrestrial station of a TDMA satellite communication network, which is capable of achieving a high frame availability.

It is another object of this invention to provide a state information communicating arrangement for use in a standard earth station of the TDMA satellite communication network, which is simple in structure and is capable of making the communication network have a high frame availability.

It is still another object of this invention to provide a state information communicating system which is capable of achieving a high frame availability.

It is an additional object of this invention to provide a state information communicating system of the type described, which is capable of simplifying a standard earth station.

Other object of this invention will become clear as the description proceeds.

A state information communicating arrangement to which this invention is applicable is for use in a terrestrial station of a time division multiple access satellite communication network comprising at least one earth station and a standard earth station which is for periodically generating standard bursts. Each of the standard bursts defines a time division multiple access frame consisting of the each of the standard bursts and a remaining part which comprises a first part for data bursts produced by the terrestrial station, the at least one earth station, and the standard earth station and a second part. The terrestrial station includes communication devices for producing the data bursts of the terrestrial station and for receiving the data bursts produced by the at least one and the standard earth stations. According to this invention, the state information communicating arrangement comprises collecting means for collecting at least one of state information signals representative of states of operation of the communication devices as a collected signal and signal sending means responsive to the collected signal for sending the collected signal in a predetermined part which is selected in the second part with reference to each of the standard bursts and in common to the terrestrial and the at least one earth stations.

Another state information communicating arrangement to which this invention is applicable is for use in a standard earth station of a time division multiple access satellite communication network comprising a plurality of terrestrial stations, at least P in number. The standard earth station is for periodically generating standard bursts. Each of the standard bursts defines a time division multiple access frame consisting of the each of the standard bursts and a remaining part which comprises a first part for data bursts produced by the standard earth and the terrestrial stations and a second part. The terrestrial stations include communication devices for dealing with the standard and the data bursts. Each of the terrestrial stations sends at least one of state information signals as at least one significant word in a predetermined part which is selected in the second part with reference to each of the standard bursts and in common to the terrestrial stations. The state information signals are representative of states of operation of the communication devices of the each of the terrestrial stations. Each of the terrestrial stations thereby sends the significant word in the predetermined parts of each of the time division multiple access frames which are spaced at least by (P - 1) consecutive time division multiple access frames from one another. In this case, the state information communicating arrangement comprises significant word extracting means for extracting the significant words sent from a selected one of the terrestrial stations as an extracted signal and monitoring means responsive to the extracted signal for monitoring the state of operation of the communication devices of the selected one of the terrestrial stations.

A state information communicating system to which this invention is applicable is for use in a time division multiple access satellite communication network comprising a plurality of terrestrial stations and a standard earth station which is for periodically generating standard bursts. Each of the standard burst defines a time division multiple access frame consisting of the each of the standard bursts and a remaining part which comprises a first part for data burst produced by the terrestrial and the standard earth stations and a second part. Each of the terrestrial stations includes communication devices for dealing with the data bursts of the terrestrial and the standard earth stations. In this event, the each of the terrestrial stations comprises collecting means for collecting at least one of state information signals representative of state of operation of the communication devices of the each of the terrestrial stations as a corrected signal and signal sending means responsive to the collected signal for sending the collected signal as at least one significant word in a predetermined part which is selected in the second part with reference to each of the standard bursts and is common to the terrestrial stations. The standard earth station comprises significant word extracting means for extracting the significant words sent from a selected one of the terrestrial stations as an extracted signal and monitoring means responsive to the extracted signals for monitoring the state of operation of the communication devices of the selected one of the terrestrial stations.

DESCRIPTION OF THE PREFERRED EMBODIMENTS

Figure 1:
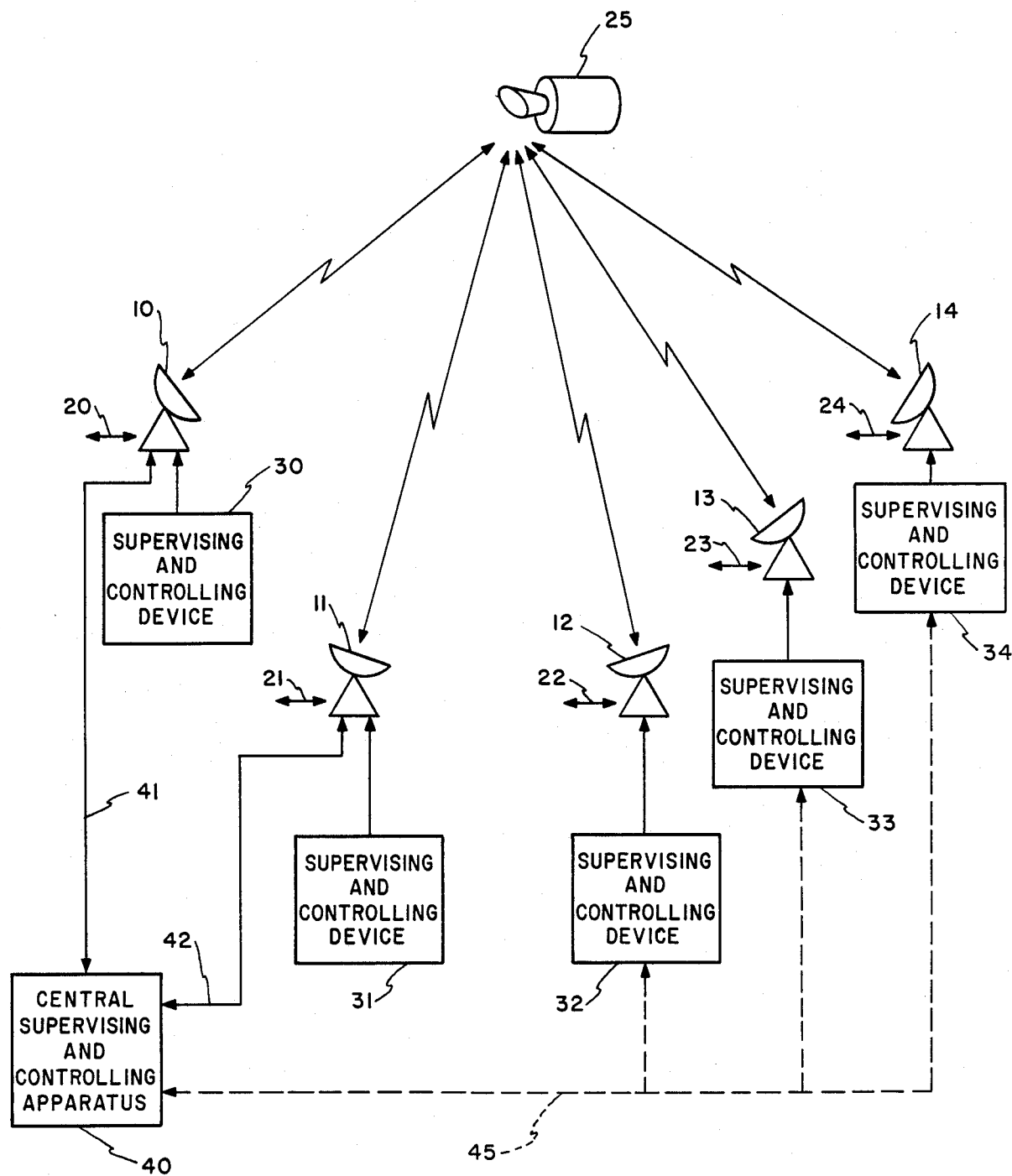
FIG. 1 is a block diagram of TDMA satellite communication network to which this invention is applicable.

Referring to FIG. 1, a TDMA satellite communication network will be described to which this invention is applicable. The satellite communication network comprises a standard earth station 10 and a plurality of terrestrial or earth stations 11 through 14. Each of the standard earth station 10 and the terrestrial stations 11 through 14 is connected to each of local transmission lines 20 through 24. Each of the local transmission lines 20 through 24 is for use in transmitting traffic data. Each of the stations 10 through 14 transmits a data burst including the traffic data to each other through a satellite 25 through satellite channels. The structure and operation of the standard earth station is similar to the structure and operation of the terrestrial stations. However, a description of the traffic processing operation of the standard earth station will be omitted hereinafter, in the interest of the brevity of description. Each of the terrestrial stations 11 through 14 is a nonattendant station in general. Each of the stations 10 through 14 includes communication arrangements or devices which will later be depicted in the accompanying drawing. The communication arrangements are for producing the data burst to be sent to the satellite 25, for receiving the data burst of others of the stations 10 through 14, and for dealing with the traffic data sent and received through a relevant one of the local transmission lines 20 through 24. The stations 10 through 14 further comprise supervising and controlling devices 30 through 34, respectively. Each of supervising and controlling devices 30 through 34 is for collecting state information signals representative of states of operation of the communication arrangements of each of the stations 10 through 14 and for sending the state information signals to the satellite 25.

The standard earth station 10 is connected to a central supervising and controlling apparatus 40 to a specific transmission line 41. The central supervising and controlling apparatus 40 may be implemented by an electronic computer and may be called a "network control center". The central supervising and controlling apparatus 40 carries out monitoring and controlling operations which are associated with the state information communication arrangement. In addition, the apparatus 40 also carries out any other operations, for example, a modification of network configuration, an authorization of new participating stations, assignments of channels to the respective satellite links, and so on. However, the latter operations are known in the art and are not directly concerned with the present invention. Therefore, the next consideration will be directed to the monitoring and controlling operations of the central supervising and controlling apparatus 40.

The monitoring and controlling operations of the central supervising and controlling apparatus 40 are for supervising or monitoring the states of operation of communication devices and associated facilities in the terrestrial stations 11 through 14, for controlling an initialization of test facilities in a selected terrestrial station by sending predetermined commands to collect data relative to the states of operation when an alarm signal is received, and for assisting operators in failure diagnostics. A logging of various data can also be carried out in this apparatus. The standard earth station 10 receives the state information signals from the respective terrestrial stations 11 through 14 through the satellite 25 and send received state information signals to the central supervising and controlling apparatus 40 through the specific transmission line 41. On the other hand, the central supervising and controlling apparatus 40 sends control information signals to the standard earth station 10 through the specific transmission line 41. The control signals are for remotely controlling the terrestrial stations 11 through 14. The standard earth station 10 receives the control signals and sends received control signals to the terrestrial stations 11 to 14 through the satellite 25.

The standard earth station 10 is generally located at a position remote from a city center in order to avoid interference of radio waves. On the contrary, the central supervising and controlling apparatus 40 is positioned at a location which is convenient in transportation. In this event, the standard earth station 10 may also be a nonattendant station. It is convenient even in this event to understand that the standard earth station comprises the central supervising and controlling apparatus 40 and is an attendant station.

The terrestrial station 11 is operable as a spare standard earth station and is connected to the central supervising and controlling apparatus 40 through a particular transmission line 42. When a trouble takes place either in the standard earth station 10 or the specific transmission line 41, the spare standard earth station 11 relieves the standard earth station 10 and serves as a new standard earth station. However, the spare standard earth station of the type described may be omitted in a TDMA satellite communication network of a small scale.

It may happen that the central supervising and controlling apparatus 40 can not make use of the satellite channels. In such a case, the central supervising and controlling apparatus 40 may supervise and control the terrestrial stations 11 through 14 through a terrestrial public communication network 45. Details will not be described because use of the terrestrial public communication network 45 has no direct concern with this invention.

It is general that a lot of items which should be supervised as supervisory items are to be transmitted from each of the terrestrial stations 11 through 14 to the standard earth station 10. The number of the supervisory items is between 50 and 160. For example, the number is different between a case where supervision should be carried out on output signals of relay contacts and another case where supervision should deal with digital values which are converted from analog results of measurement. On the contrary, the standard earth station 10 transmits to each of the terrestrial stations 11 through 14 control items which are between 10 and 30 in number. The number of supervisory and control items varies in accordance with the scale and the function of each terrestrial station.

In an ordinary state of operation, each terrestrial station may transmit the state information signals which represent that all of the supervisory items are normal. On the contrary, each terrestrial station should successively transmit in an extraordinary state of operation the state information signals representative of all data related to all of the supervisory items. In addition, a terrestrial station in the extraordinary state should successively transmit the state information signals which represent change of each supervisory item and/or a measurement value of each supervisory item in response to control information signals which the central supervising and controlling apparatus 40 transmits in order to diagnose a failure of the terrestrial station under consideration. Therefore, a satellite channel for transmitting the state information signals for each terrestrial station should have a capacity enough to transmit the state information signals in the extraordinary state.

Figure 2:
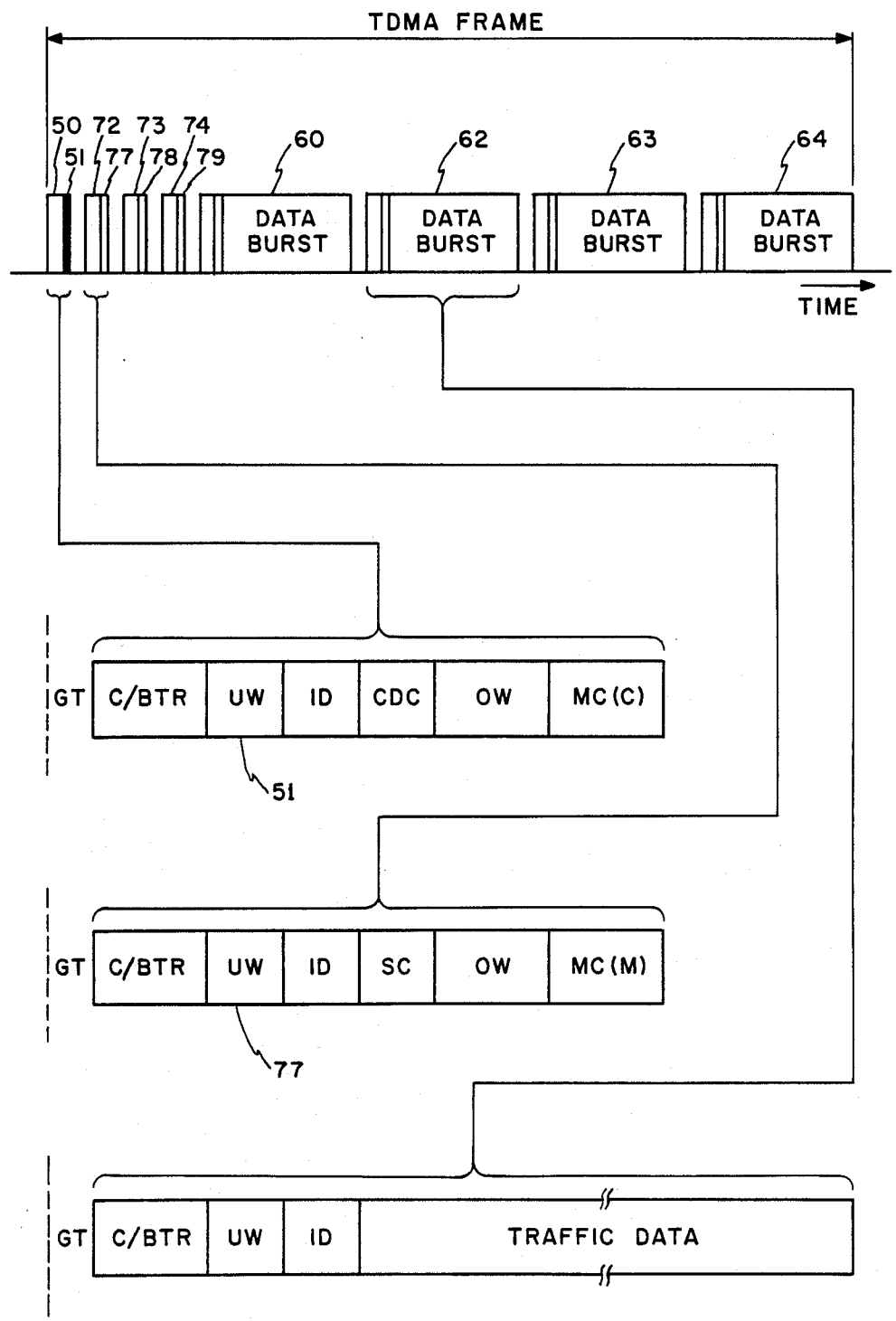
FIG. 2 is a time chart for use in describing a conventional state information communicating system.

Referring to FIG. 2 afresh and FIG. 1 again, a conventional state information communicating system in the TDMA satellite communication network will be described for a better understanding of this invention. The description will be made as regards a simple model which comprises a standard earth station 10 and three terrestrial earth stations 12 through 14. The standard earth station 10 is for periodically generating standard or reference bursts. One of the standard bursts is depicted in FIG. 2 by a reference numeral 50. Each standard burst 50 includes a frame synchronization signal 51 and defines a TDMA frame. The TDMA frame consists of each standard burst 50 and a remaining part. The remaining part comprises first and second parts. The first part is for data bursts 60 and 62 through 64 produced by the standard earth station 10 and the terrestrial stations 12 through 14, respectively. Each of the data bursts 60 and 62 through 64 includes a traffic data to be transmitted. The second part is a remaining part of each TDMA frame. The terrestrial stations 12 through 14 receive each standard burst 50 as a received standard burst and send the data bursts 62 through 64 in accordance with standard timing provided by the frame synchronization signal 51 of the received standard burst. The terrestrial stations 12 through 14 send the data bursts 62 through 64 by the use of a carrier wave which is common to all of the standard earth and the terrestrial stations 10 and 12 through 14.

The terrestrial stations 12 through 14 send synchronization bursts 72 through 74, respectively. The synchronization bursts 72 through 74 are positioned at different locations in the second part of each TDMA frame. The synchronization bursts 72 through 74 are for use in the respective terrestrial stations 12 through 14 in synchronizing the data bursts 62 through 64 relative to the received standard burst, respectively. Such synchronization of each data burst may be called burst synchronization. The synchronization bursts 72 through 74 include burst synchronization signals 77 through 79, respectively. Operation of the burst synchronization of the terrestrial stations will be exemplified for the terrestrial station 12 in the following.

The terrestrial station 12 sends the synchronization burst 72 with reference to the received standard burst and receives the synchronization burst 72 as a received synchronization burst through the satellite 25. The terrestrial station 12 measures a time interval between the burst synchronization signal 77 of the received synchronization burst 72 and the frame synchronization signal 51 of the received standard burst and compares the time interval with a predetermined time interval to get an error of transmission timing of the terrestrial station 12. The terrestrial station 12 corrects the location of the data burst 62 so as to correct the error of the transmission timing. This maintains the burst synchronization of the terrestrial station 12. The burst synchronization of the other terrestrial stations 13 and 14 can also be maintained in the manner exemplified for the terrestrial station 12.

Use of the synchronization bursts brings about a merit such that the position and the length of the data burst can be decided independently of maintenance of the burst synchronization of each terrestrial station to thereby bring about flexibility in operation of the TDMA satellite communication network.

The synchronization bursts 72 through 74 in the second part of the TDMA frame are collected in the known manner.

In another TDMA satellite communication network wherein the synchronization bursts 72 through 74 in the second part are not collected, the data bursts 62 through 64 include the burst synchronization signals 77 through 79, respectively. In such a case, the burst synchronization may be carried out at each terrestrial station by the use of the burst synchronization signal of the data burst instead of the burst synchronization signal of the synchronization burst.

In the manner depicted in FIG. 2 on a large scale for the standard burst 50, the standard burst 50 comprises a carrier/bit timing recovery pattern C/BTR at the head of the standard burst 50. The carrier/bit recovery pattern C/BTR is for facilitating regeneration of a carrier wave and bit timing of the standard burst 50 in a demodulator of each terrestrial station. The frame synchronization signal 51 follows the carrier/bit timing recovery pattern C/BTR. The frame synchronization signal 51 may be called a unique word UW because the frame synchronization signal 51 uniquely appears in a random series of codes. An identification code ID follows the unique word UW. The identification code ID is for identifying a station sending the standard burst 50 and a state of operation of the station. A control data channel CDC follows the identification code ID. The control data channel CDC is for use in controlling each of the terrestrial stations 12 through 14 from a standard terminal equipment of the standard earth station 10. The control data channel CDC is followed by an order wire channel OW. The order wire channel OW is for use in exchanging various information between the standard earth station 10 and each of the terrestrial stations 12 through 14. For example, burst time plan information and channel mapping information may be transmitted by the use of the order wire channel OW when necessary. The burst time plan information is for assigning a plurality of time slots of the TDMA frame to the respective terrestrial stations 12 through 14. The channel mapping information is for specifying a relation of connection between the satellite channels and the respective local transmission lines 22 through 24. The central supervising and controlling apparatus 40 generates and sends the burst time plan information and the channel mapping information when necessary. It is not always necessary to transmit the burst time plan information and the channel mapping information.

The order wire channel OW is followed by a control information time slot MC(C) which exists at the last of the standard burst 50. The control information time slot MC(C) is for use in transmitting the control information signals from the central supervising and controlling apparatus 40 of the standard earth station 10 to each terrestrial station.

Each of the synchronization bursts 72 through 74 has a structure which will be described about the synchronization burst 72 as a representative. In the manner depicted on a large scale, the synchronization burst 72 comprises a carrier/bit timing recovery pattern C/BTR at the head of the synchronization burst 72. The carrier/bit pattern C/BTR is for facilitating regeneration of the carrier wave and bit timing of the synchronization burst 72 in a demodulator of the terrestrial station 12. The burst synchronization signal 77 follows the carrier/bit timing recovery pattern C/BTR. The burst synchronization signal 77 may also be called a unique word UW. An identification code ID follows the unique word UW. The identification code ID is for identifying a station sending the synchronization burst 72 and a state of operation of the station. A service channel SC follows the identification code ID. The service channel SC is for use in transmitting response signals to control information signals sent from the standard terminal equipment. The service channel SC is also for use in transmitting single ones of the state information signals of the terrestrial station 12. The service channel SC is followed by an order wire channel OW. The order wire channel OW is for use in exchanging various information between the terrestrial station 12 and the standard earth station 12.

The order wire channel OW is followed by a state information time slot MC(M) which stands at the tail of the synchronization burst 72. The state information time slot MC(M) is for use in transmitting the state information signals used in this invention from the terrestrial station 12 to the standard earth station 10.

Each of the synchronization bursts 73 and 74 has a structure which is substantially similar to that of the synchronization burst 72.

Each of the data bursts 60 and 62 through 64 has a format which will be described about the data burst 62 as a representative. In the manner depicted on a large scale, the data burst 62 comprises a carrier/bit timing recovery pattern C/BTR which is substantially similar to that of either the standard burst 50 or the synchronization burst 72. A unique word UW which follows the carrier/bit timing recovery pattern C/BTR, is also substantially similar to that of the standard burst 50 or the synchronization burst 72. An identification code ID which follows the unique word UW, is substantially similar to that of the standard burst 50 or the synchronization burst 72. The identification code ID is followed by a traffic data to be transmitted. In view of this, a part comprising the carrier/bit timing recovery pattern C/BTR, the unique word UW, and the identification code ID may be called a preamble word.

Each of the data bursts 60, 63 and 64 has a structure which is substantially similar to that of the data burst 62.

A guard time GT is placed before each of the standard, the synchronization, and the data bursts. The guard time GT is for avoiding superposition of the standard, the synchronization, and the data bursts on one another in each TDMA frame.

In the other TDMA satellite communication network described above, the synchronization bursts 72 through 74 do not exist in the second part. In such a case, the state information time slot MC(M), the service channel SW, and the order wire channel OW must be included in the preamble word of the data burst.

The standard burst, the synchronization bursts, and the preamble words of the data bursts are not substantially used for transmitting the traffic data. As regards each TDMA frame, it is already described heretobefore that a ratio of a total time slot used for the traffic data to the TDMA frame is defined as a frame availability. The conventional state information communicating system is unsuitable to achieve a high frame availability because the state information time slots MC(M) are included in each TDMA frame for the respective terrestrial stations as described above.

A high frame availability may be achieved in the conventional state information communicating system if each terrestrial station divides the state information signals into a lot of divisions to send the divisions by the use of narrow state information time slots in a plurality of TDMA frames, respectively, in the manner described hereinabove. It is assumed that a significant word is composed of the state information signals of thirty-two bits. Each of the divisions is typically of only two bits. In this case, the divisions are sent by the narrow state information time slots in sixteen TDMA frames. Inasmuch as each division has no significant meaning, the standard earth station 10 has to receive and collect all of the divisions for each terrestrial station and to assemble the divisions into at least one significant word. Assembling of the divisions is also necessary in order to carrying out an error control process of the divisions. Therefore, the standard earth station 10 needs a complicated processing device in order to assemble the divisions in the manner described hereinabove.

Figure 3:
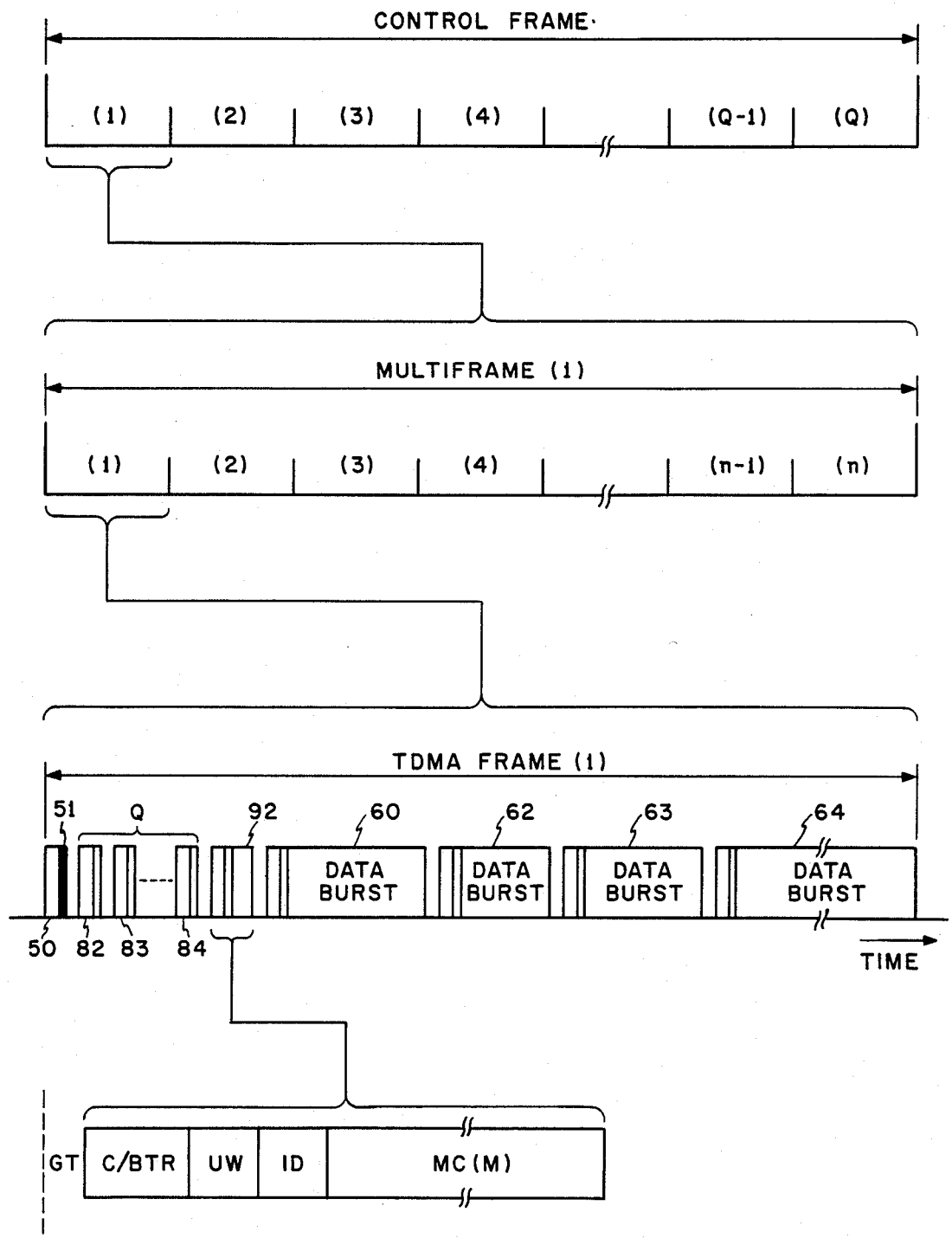
FIG. 3 is a time chart for use in describing a state information communicating system according to a first embodiment of this invention.

Referring to FIG. 3 afresh and FIG. 1 again, a state information communicating system according to a first embodiment of this invention will now be described. In FIG. 3, each TDMA frame is defined by the standard bursts 50 each of which is sent by the standard earth station 10 like in the conventional state information communicating system. Multiframes and control frames are defined on the basis of the TDMA frames. That is, each of the multiframes consists of a plurality of the TDMA frames, n in number. Each of the control frames consists of a plurality of the multiframes, Q in number. It is assumed that P represents the number of terrestrial stations comprising the terrestrial stations 12 through 14, excluding the standard earth station 10 and the spare standard earth station 11, and including terrestrial stations which may take part in the TDMA communication network in future. In this case, the number Q is given by:

$$Q \geq P/n. \quad (1)$$

The data bursts 60, 62 and 63 are sent in every TDMA frame like in the conventional state information communicating system. Synchronization bursts 82 through 84 are sent in every multiframe in order to obtain a high frame availability. This is because the frame availability would be reduced if the synchronization bursts 82 through 84 were sent in every TDMA frame as in the conventional state information communicating system. The number of the synchronization bursts 82 through 84 which are included in one TDMA frame is equal to Q. The synchronization bursts 82 through 84 are similar to the synchronization bursts 72 through 74 described in conjunction with FIG. 2 except that each of the synchronization bursts 82 through 84 has no state information time slot MC(M).

In order to define the multiframe, the standard earth station 10 produces a predetermined pattern as the frame synchronization signal in each succession of n TDMA frames instead of the pattern to be sent in the conventional manner as the frame synchronization signal 51 described in connection with FIG. 2. The terrestrial stations 12 through 14 make use of the predetermined pattern as a marker of the multiframe in the manner known in the art.

A state information burst 92 which is a feature of this invention, is sent at a predetermined part which is selected in the second part and which is common to all terrestrial stations 12 through 14. The state information burst 92 is for use in transmitting the state information signals from each of the terrestrial stations 12 through 14 to the standard earth station 10. In a certain one of the multiframes, the state information burst 92 is placed by the terrestial station which sends the synchronization burst 82. In the next multiframe, the state information burst 92 is sent by the terrestrial station which sends the synchronization burst 83. The state information burst 92 follows the synchronization bursts 82 through 84 in one TDMA frame of each multiframe. As a result, all terrestrial stations send the respective state information bursts 92 once in Q multiframes, that is in one control frame. In order to define the control frame, the standard earth station 10 sends a specific code for defining the control frame by the use of the control data channel CDC (FIG. 2) of the standard burst 50. Inasmuch as software is usable in changing the information to be conveyed by the control data channel CDC, it is readily possible to make the control frame have a different frame length in accordance with a variation in the number of the terrestrial stations in the TDMA satellite communication network. The number and positions of the synchronization bursts 82 through 84 can be changed by changing the burst time plan.

As depicted on a large scale in FIG. 3, the state information burst 92 comprises a preamble word comprising a carrier/bit timing recovery pattern C/BTR, a unique word UW, and an identification code ID. The preamble word is substantially similar to that of the data burst 62 illustrated in FIG. 2. A state information time slot MC(M) follows the preamble word. The state information time slot MC(M) is for use in sending the state information signals collectively as at least one significant word from each terrestrial station.

Figure 4:
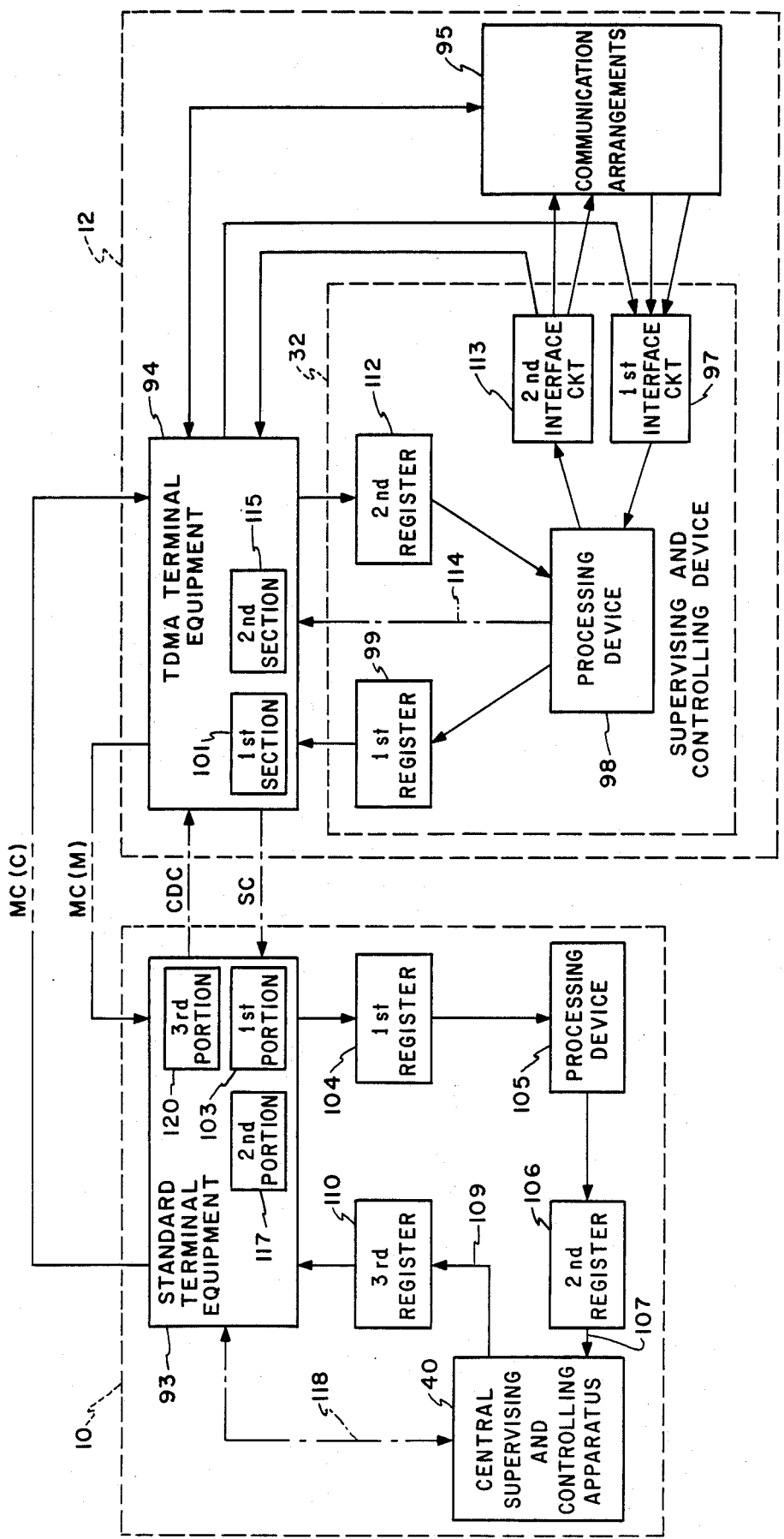
FIG. 4 is a block diagram of a standard earth station and a terrestrial station according to the first embodiment of this invention.

Referring to FIG. 4 afresh, description will be continued as regards the state information communicating system for the frame format illustrated with reference to FIGS. 1 and 3. State information communication will be described for the standard earth station 10 and the terrestrial station 12 as the representative of the terrestrial stations.

The standard earth station 10 comprises a standard terminal equipment 93 of the type described above.

The terrestrial station 12 comprises a TDMA terminal equipment 94. Under control of the standard terminal equipment 93, the TDMA terminal equipment 94 is operable as one of the communication arrangements or devices that is for producing the data bursts 62 (FIG. 3) of the terrestrial station 12 and is for receiving the data bursts 60, 63, and 64 produced by the standard earth station 10 and the terrestrial stations 13 and 14 (FIG. 1). The TDMA terminal equipment 94 is coupled to other communication arrangements which are collectively depicted as a block 95 and which are, for example, relay contacts for making the TDMA terminal equipment 94 produce the data bursts 62 and receive the data bursts 60, 63 and 64.

The supervisory and controlling device 32 of the terrestrial station 12 comprises a first interface circuit 97. The first interface circuit 97 is for collecting the state information signals representative of states of operation of the communication arrangements 94 and 95 and for converting the state information signals into collected state information signals. The first interface circuit 97 is therefore operable as a collecting circuit which is for collecting the state information signals as the collected signals.

A processing device 98 is responsive to the collected information signals for producing a data word consisting of at least one significant word. The data word is to be transmitted to the central supervising and controlling apparatus 40. The processing device 98 may be implemented by the use of, for example, a microcomputer and a memory circuit. The processing device 98 stores an entire data word in a first register 99 of the first-in first-out (FIFO) type. Simultaneously, the first register 99 is loaded by the processing device 98 with, besides the entire word, an identification code of the terrestrial station 12 and a check bit for use in error control, such as a cyclic redundancy check method. A format consisting essentially of the entire data word, the identification code, and the check bit may be referred to as a data packet. When the entire data word has a word length which is longer than the state information time slot MC(M) of the state information burst 92, the processing device 98 divides the entire data word into a plurality of significant words and stores the significant words successively. In this case, the processing device 98 stores a classification code common to the significant words in the first register 99 in addition to each significant word, the identification code, and the check bit. Another format consisting essentially of each significant word, the identification code, the check bit, and the classification code may also be referred to as the data packet.

A first section 101 of the TDMA terminal equipment 94 reads the data packet out of the first register 99 once in one control frame in order to temporarily store the data packet in a buffer memory (not shown) of the first section 101 and sends the data packet by the use of the state information time slot MC(M) of the state information burst 92. Thus, the first section 101 is operable with relation to sending the data packet and may be referred to as that state information sending section or that signal sending section which is responsive to the collected signals for sending the collected signals in the state information time slot MC(M) with reference to the standard burst 50.

On reception of the state information burst 92, a first portion 103 of the standard terminal equipment 93 of the standard earth station 10 extracts the data packet from the state information burst 92. That is, the first portion 103 is operable as a significant word extracting section which is for extracting the significant words sent from a selected one of the terrestrial stations as an extracted signal. The first portion 103 stores the data packet into a first register 104 of the first-in first-out type of the standard earth station 10.

A processing device 105 is responsive to the data packet stored in the first register 104 and delivers the data packet to the central supervising and controlling apparatus 40 through a second register 106 and a specific transmission line 107. The central supervising and controlling apparatus 40 supervises the terrestrial station 12 with reference to the data packet. Therefore, the central supervising and controlling apparatus 40 may be referred to as a monitoring device responsive to the extracted signal for monitoring the state of operation of the communication arrangements 94 and 95 of the selected one of the terrestrial stations 12 through 14.

Inasmuch as at least one significant word is included in the data packet, the processing device 105 need not assemble the divisions of the significant word and is therefore simple in structure. The processing device 105 carries out only transformation of the data packet into a transformed data packet having a format suitable for the specific transmission line 107. For example, the transformation is carried out by adding a flag for synchronization to the data packet. If the terrestrial station 12 omits transmission of the identification code thereof for the purpose of shortening the state information burst 92, the standard earth station 10 has to add the identification code.

Description will be made about a case that the specific transmission line 107 does not have a capacity enough to deliver the data packets for all terrestrial stations. In such a case, the data word of the data packet will be subjected to a certain modification. A control bit is inserted under the circumstances in the data packet by each terrestrial station in order to indicate whether or not the data word is subjected to the modification. The processing device 105 checks the control bit of each data packet and preferentially provides the specific transmission line 107 with the data packet in which the data word has the modification.

Description will now proceed with all terrestrial stations taken into consideration. The central supervising and controlling apparatus 40 sends the control information signals to the standard terminal equipment 93 through another specific transmission line 109 and a third register 110 of the first-in first-out type on detection of an extraordinary state of the communication arrangements, such as 94 and 95, of any one of the terrestrial stations on the basis of the data word sent from the terrestrial station in question. Alternatively, the central information signals may be sent for the purpose of mere maintainance of the terrestrial stations. In either case, the standard terminal equipment 93 sends the control information signals to the terrestrial stations by the use of the control information time slot MC(C) of the standard burst 50. Therefore, the control information signals which the central supervising and controlling apparatus 40 provides to the specific transmission line 109 are restricted to an amount of successive data included within the limits of 1200 bauds. The control information signals are sent to the terrestrial stations once in one TDMA frame. The control information signals to be sent at one time have not necessarily a significant meaning.

Attention will again be directed to the terrestrial station 12 as the representative. The TDMA terminal equipment 94 successively receives only the control information signals of the standard bursts 50 and successively sends the received control information signals to a second register 112 of the first-in first-out type in the supervising and controlling device. A succession of the control information signals are transformed into a significant word by the second register 112.

The processing device 98 receives the control information signals as the significant word and judges whether or not the control information signals are directed to the terrestrial station 12 by decoding the control information signals. If the control information signals are directed to the station 12, the processing device 98 sends control signals to the communication arrangements 94 and 95 in accordance with content of the control information signals. The content indicates, for example, drive of the relays.

Description will proceed to a case where an extraordinary state takes place in the communication arrangements, such as 94 and 95, of the terrestrial station 12. The processing device 98 is operable as a detecting section for detecting the extraordinary state of operation of the communication arrangements 94 and 95 in consideration of the state information signals collected by the first interface circuit 97 to produce an alarm signal 114 representative of the extraordinary state. A second section 115 of the TDMA terminal equipment 94 is operable as an alarm signal sending section for sending the alarm signal 114 at a preselected part of the synchronization burst 82. In the format illustrated with reference to FIG. 3, the service channel SC is used as the preselected part. When the synchronization bursts do not exist in the second part, the service channels SC are included in the respective preamble words of the data bursts. In such a case, the second section 115 should place the alarm signal 114 at that preselected part, namely, that service channel SC, which is selected in a part of the data burst of the terrestrial station 12. At any rate, the alarm signal 114 is transmitted from the terrestrial station 12 to the standard earth station 10 by the use of the service channel SC.

On the other hand, the standard terminal equipment 93 of the standard earth station 10 comprises a second portion 117. The second portion 117 is operable as an alarm signal receiving section which is for extracting the alarm signal from the preselected part, that is, the service channel, to produce an alarm indicating signal indicative of reception of the alarm signal. The alarm indicating signal is immediately transmitted to the central supervising and controlling apparatus 40 through a transmission line 118.

On reception of the alarm signal, the standard station 10 carries out either first or second operation as follows.

The first operation will be described at first. It will be assumed that the alarm signal is sent from the terrestrial station 12. The standard terminal equipment 93 comprises a third portion 120. The third portion 120 is operable as a command sending section which is responsive to the alarm indicating signal and which is for sending a command signal at a predetermined portion, namely, the control information time slot MC(C), of the standard burst 50. The third portion 120 sends the command signal to all of the terrestrial stations by the use of the control information time slot MC(C) either on reception of the alarm signal from the terrestrial station 12 or in accordance with an instruction of the central supervising and controlling apparatus 40.

The command signal makes the terrestrial station 12 send the state information signals at the predetermined part, namely, the state information time slot MC(M), of every TDMA frame during a predetermined time duration. The command signal also makes other terrestrial stations stop sending the state information signals during the predetermined time duration. As a result, the TDMA terminal equipment 94 of the terrestrial station 12 reads the data packet out of the first register 99 once in one TDMA frame. Therefore, the processing device 98 is capable of processing a greater amount of the state information signals.

The second operation will be described. On reception of the alarm signal, the standard terminal equipment 93 sends control information signals to the terrestrial station 12 by the use of the control information time slot MC(C) for the purpose of failure diagnosis which is carried out by the central supervising and controlling apparatus 40. The control information signals is for remotely controlling the communication arrangements 94 and 95 and/or test devices (not shown) of the terrestrial station 12 and for making the terrestrial station 12 send changes of states of the communication arrangements 94 and 95 and so on by the use of the state information time slots MC(M), each of which appears once in one TDMA frame.

Even if an extraordinary state occurs in another terrestrial station, the standard earth station 10 can deal with the extraordinary state. This is because the standard earth station 10 always supervises the service channel SC so that the standard earth station 10 can receive an alarm signal from the other terrestrial station.

In the state information communicating system thus far described, the state information sending section 101, or the first section, may convey the state information signals placed at the predetermined part, namely, the state information time slot MC(M), on a carrier wave which has a predetermined carrier frequency. The predetermined frequency is common to all of the terrestrial stations.

Figure 5:
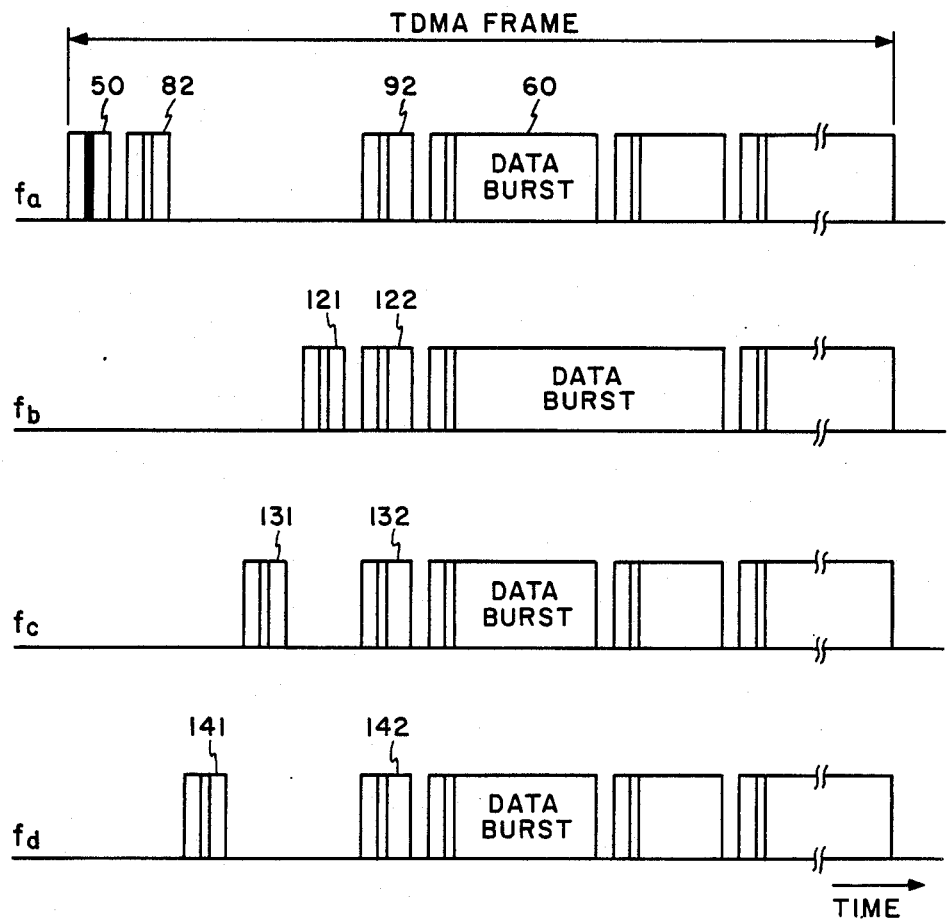
FIG. 5 is a time chart for use in describing a state information communicating system according to a second embodiment of this invention.
Figure 6:
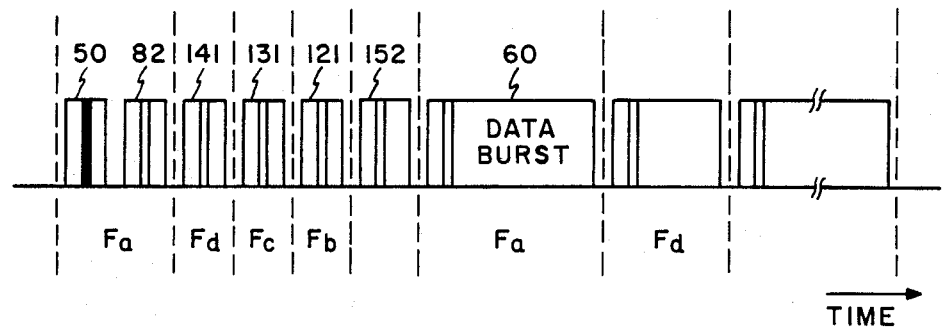
FIG. 6 is a time chart for use in describing the state information communicating system according to the second embodiment of this invention.

Referring to FIGS. 5 and 6 afresh and FIGS. 1 and 4 again, four carrier waves may be used in a state information communicating system according to a second embodiment of this invention. The four carrier waves have different carrier frequencies fa, fb, fc, and fd for use in sending all of the bursts as uplink signals. The four carrier waves having carrier frequencies fa, fb, fc, and fd are converted into four carrier waves having different carrier frequencies Fa, Fb, Fc, and Fd, respectively, by a transponder of the satellite 25.

It is possible to carry out the carrier wave hopping operation known in the art on sending the bursts and/or on reception of the bursts. However, it will be assumed that the carrier wave hopping operation is carried out only on reception of the bursts. That is to say, each of the standard earth and the terrestrial stations 10 through 14 is assigned with one carrier wave selected from the carrier waves of carrier frequencies fa, fb, fc, and fd in order to send the burst and is capable of receiving each of the carrier waves of carrier frequencies Fa, Fb, Fc, and Fd by switching the carrier waves.

In FIG. 5, a format of a TDMA frame is illustrated as regards each of the four carrier waves which reach the satellite 25. The standard station 10 is assigned with the carrier frequency fa in order to send standard and data bursts. The standard station 10 sends the standard burst 50 and the data burst 60 by the use of a carrier wave of frequency fa. A first synchronization time slot for the synchronization burst 82 is common to a first station group consisting of all terrestrial stations which are assigned with the carrier frequency fa. Each terrestrial station of the first station group sends the synchronization burst 82 once in n TDMA frames by the use of the first synchronization time slot. A first state information burst time slot for the state information burst 92 is also common to the first station group. Each terrestrial station of the first station group also sends the state information burst 92 once in n TDMA frames by the use of the first state information burst time slot. It will be assumed for brevity of description that the terrestrial station sends both the synchronization burst 82 and the state information burst 92 in some TDMA frame.

If a TDMA satellite communication network comprises a spare standard earth station described above, the standard earth station 10 may be supervised and controlled by the spare standard station. In such a case, the standard earth station 10 sends a synchronization burst and a state information burst once in n TDMA frames like in the terrestrial station of the first station group.

A second synchronization time slot for a synchronization burst 121 is common to a second station group of all terrestrial stations which are assigned with the carrier frequency fb. Each terrestrial station of the second station group sends the synchronization burst 121 once in n TDMA frames like the terrestrial station of the first station group. A second state information burst time slot for a state information burst 122 is also common to the second station group. Each terrestrial station of the second station group also sends the state information burst 92 once in n TDMA frames like the terrestrial station of the first station group.

A synchronization burst 131 and a state information burst 132 are conveyed once in n TDMA frames on the carrier wave of carrier frequency fc from a terrestrial station of a third station group to the satellite 25. A synchronization burst 141 and a state information burst 142 are conveyed once in n TDMA frames on the carrier wave of carrier frequency fd from a terrestrial station of a fourth station group to the satellite 25.

The synchronization bursts 82, 141, 131, and 121 are placed at positions different from one another in the TDMA frame. The state information burst time slots for the state information bursts 92, 122, 132, and 142 are coincident with one another in the TDMA frame. In the TDMA frame, each of the state information bursts 92, 122, 132, and 142 is followed by a succession of the data bursts.

Receiving operation, namely carrier wave hopping operation, of the standard earth station 10 will be described. In FIG. 6, each of broken lines is a switching timing of the carrier wave. In a first portion which is depicted at the head of the TDMA frame, the standard earth station 10 receives the carrier wave of the frequency Fa and extracts the standard burst 50 and the synchronization burst 82. In a second portion following the first portion, the standard earth station 10 receives the carrier wave of the frequency Fd and extracts the synchronization burst 141. In a third portion following the second portion, the standard earth station 10 receives the carrier wave of the frequency Fc and extracts the synchronization burst 131. In a fourth portion following the third portion, the standard earth station 10 receives the carrier wave of the frequency Fb and extracts the synchronization burst 121. Inasmuch as the synchronization bursts 82, 141, 131, and 121 are transmitted at positions different from one another in the TDMA frame, all of the standard and the synchronization bursts can be received by the carrier wave hopping operation of the standard earth station.

The fourth portion is followed by a fifth portion corresponding to a state information burst time slot 152. In the state information burst time slot 152, the standard earth station 10 selectively receives the state information burst conveyed on one of the carrier waves that is selected from all of the four carrier waves. The standard earth station 10 is generally controlled so as to successively receive the state information bursts 92 conveyed on the carrier wave of the frequency fa for n TDMA frames. Subsequently, the standard earth station 10 successively receives the state information bursts 122 sent on the carrier wave of the frequency fb for n TDMA frames. Inasmuch as the standard earth station 10 carries out successive reception of the state information bursts in each of the four carrier waves, the standard station 10 again goes back to the initial state at a period of $4 \times n$ TDMA frames. When M carrier waves are used instead of four, the standard station 10 periodically receives the data burst from each terrestrial station at a period of $M \times n$ TDMA frames. This results in replacing the number Q for use in the control frame illustrated in FIG. 3 with the number M of the carrier waves. As a result, the number P of terrestrial stations is given by:

$$P \leq M \times n. \quad (2)$$

Inasmuch as the standard station 10 receives the state information burst from each terrestrial station at the period of $M \times n$ TDMA frames, each terrestrial station may send the state information burst at the period of $M \times n$ TDMA frames so as to coincide with reception timings for each terrestrial station.

However, such a coincidence operation is complicated. Therefore, each terrestrial station sends the state information burst once in n TDMA frames. In this case, each terrestrial station repeatedly sends the state information burst having the same information or content M times. In FIG. 4, the state information sending section 101 of each TDMA terminal equipment reads the data packet out of the first register 99 once in $M \times n$ TDMA frames and stores the data packet in the buffer memory. Thereafter, the state information sending section 101 repeatedly sends the stored data packet once in n TDMA frames M times.

Description will be made about a case that an extraordinary state occurs in one of the terrestrial stations. In FIG. 4, the alarm signal sending section or the second section 115 of the TDMA terminal equipment sends an alarm signal 114 representative of the extraordinary state to the standard earth station 10 by the use of the service channel SC like in the state information communicating system according to the first embodiment of this invention. On reception of the alarm signal, the alarm signal receiving section or the second portion 117 stops switching among the carrier waves during a predetermined time duration. Simultaneously, the alarm signal receiving section 117 supervises the carrier wave for the terrestrial station bringing about the extraordinary state during the predetermined time duration. The predetermined time duration is equal to a time duration which corresponds to the number of TDMA frames obtained by multiplying n TDMA frames by a positive integer greater than 1.

After transmission of the alarm signal, the TDMA terminal equipment 94 orders the state information sending section 101 to read the data packet out of the first register 99 once in n TDMA frames and to send the data packet once in n TDMA frames. As a result, the terrestrial station can transmit a large amount of the state information signals to the central supervising and controlling apparatus 40 of the standard station 10 in the extraordinary state. The amount of the state information signals is M times the amount of the state information signals which can be transmitted in the ordinary state.

In order to receive each of the state information bursts 92, 122, 132, and 142, a partial portion (not shown) of the standard terminal equipment 93 is used in periodically changing the control of the carrier wave hopping operation at the state information burst time slot 152. As regards such a partial portion, reference is invited to U.S. patent application Ser. No. 732,420 filed May 9, 1985, now U.S. Pat. No. 4,688,216, by the instant applicant for assignment to the present assignee. It should be noted in this connection that the part described in the referenced patent application is for periodically changing the control of the carrier wave hopping operation at another burst time slot which is different from the state information burst time slot.

As mentioned before, a state information communicating system according to this invention is capable of achieving a high frame availability. This is because only one state information time slot MC(M) is included in each TDMA frame and is common to all of the terrestrial stations. In addition, each of the terrestrial stations can transmit the state information signals to the standard earth station as at least one significant word in the state information communicating system. Therefore, the standard earth station need not assemble a plurality of divisions of the significant word. Accordingly, the standard earth station becomes simple in structure.

While the present invention has thus far been described in conjunction with a few preferred embodiments thereof, it will now readily possible for those skilled in the art to practice this invention in various other manners. For example, the signal sending section 101 of the first embodiment of this invention may be for sending the collected signal in the state information time slot MC(M) of each of TDMA frames which are spaced at least by (P−1) consecutive TDMA frames from one another, where P represents the number of the terrestrial stations. Furthermore, this invention is applicable to the afore-mentioned other TDMA satellite communication network. In the other TDMA satellite communication network, synchronization bursts 82 through 84 may not exist in the second part. In this event, the service channel SC and the order wire channel OW of each synchronization burst are included in the preamble word of each data burst.

What is claimed is:

1. An arrangement for sending information about the operational state of a terrestrial station in a time division multiple access satellite communication network, said arrangement comprising at least one earth station and at least one standard earth station which periodically generates standard bursts; each of said standard bursts defining a time division multiple access frame consisting of said standard burst and a remaining part; said remaining part comprising a first and a second part; said first part being for transmission of data bursts which are produced by said terrestrial station, said at least one earth station, and said at least one standard earth station; said terrestrial station including communication devices for transmitting the data bursts produced by said terrestrial station and for receiving the data bursts produced by said at least one earth station and said at least one standard earth station; said communication devices having a plurality of supervisory conditions which are to be monitored and which specify the states of operation of said communication devices;
    collecting means for collecting, one at a time, a set of state information signals; each of said sets of state information signals being representative of at least one of said operational states of said communication devices; and
    signal sending means responsive to a collected signal from said collecting means for sending said collected signal in a predetermined part which is selected in said second part with reference to each of said standard bursts and in common to said terrestrial station and said at least one earth station.

2. An arrangement as claimed in claim 1, said time division multiple access satellite communication network comprising said terrestrial and said at least one earth station which is not greater in number than a predetermined integer P, wherein said signal sending means is for sending said collected signal in the predetermined part of each of the time division multiple access frames which are spaced at least by (P−1) consecutive time division multiple access frames from one another.

3. An arrangement as claimed in claim 2, wherein said signal sending means is for sending said collected signal in said predetermined part in the form of at least one significant word which has a predetermined format and which is representative of at least one of said operational states of said communication device.

4. An arrangement as claimed in claim 3, wherein said signal sending means is for sending said at least one sigificant word in said predetermined part without placing any significant word in said predetermined part which is sent from said at least one earth station.

5. An arrangement as claimed in claim 1, further comprising:
    detecting means responsive to said collected signal for detecting an extraordinary operational state in at least one of said communication devices in consideration of the state information signals of said collected signal to produce an alarm signal indicative of said extraordinary state; and
    alarm signal sending means responsive to said alarm signal for sending said alarm signal.

6. An arrangement as claimed in claim 1, wherein said signal sending means is for sending said collected signal in said predetermined part on a carrier wave of a carrier frequency which is shared by uplinks of said satellite commmunication network.

7. An arrangement as claimed in claim 1, wherein said signal sending means is for sending said collected signal in said predetermined part on a carrier wave whcih is assigned to said terrestrial station by selecting a plurality of carrier frequencies assigned to up-links of said satellite communication network.

8. A state information communicating arrangement for use in a standard earth station of a time division multiple access satellite communication network comprising a plurality of terrestrial stations, there being at least P number of terrestrial stations, said standard earth station periodically generating standard bursts, each of said standard bursts defining a time division multiple access frame consisting of each of the standard bursts and a remaining part which comprises a first part for data bursts produced by said standard earth station and said terrestrial stations and a second part, said terrestrial stations including communication devices for dealing with said standard and said data bursts, each of said terrestrial stations sending a set of state information signals as at least one significant word in a predetermined part which is selected in said second part with reference to each of said standard bursts and in common to said terrestrial stations, said state information signals being representative of at least one state of operation of the communication devices of said each of the terrestrial stations to specify supervisory conditions which are to be monitored, each of said terrestrial stations thereby sending the significant word in the predetermined part of each of the time division multiple access frames which are spaced at least by (P−1) consecutive time division multiple access frames from one another, wherein the improvement comprises:
    significant word extracting means for extracting the significant words sent from a selected one of said terrestrial stations as an extracted signal; and monitoring means responsive to said extracted signal for monitoring the state of operation of the communication devices of said selected one of the terrestrial stations.

9. A state information communicating arrangement as claimed in claim 8, said terrestrial stations being capable of sending alarm signals in a part which is selected with reference to each of said standard bursts and which is exclusively preselected for each of said terrestrial stations and which is different from said predetermined part common to said terrestrial stations, said alarm signals being indicative of extraordinary states of operations of the communication devices of said terrestrial stations, said state information communicating arrangement further comprising:

alarm signal extracting means for extracting the alarm signals sent from a particular one of said terrestrial stations as an alarm indicating signal, said particular one of the terrestrial stations being that one of said terrestrial stations in which at least one of the communication devices is in the extraordinary state of operation; and command sending means responsive to said alarm indicating signal for sending a command signal in a prescribed part which is selected in each of said standard bursts, said command signal being for making said particular one of the terrestrial stations send the signficant words in the predetermined parts of a preselected number of successive time division multiple access frames while making at least one of said terrestrial stations suspend sending of the significant words during the successive time divsion multiple access frames of said preselected number.

10. In a state information communicating system for use in a time division multiple access satellite communication network comprising a plurality of terrestrial stations and at least one standard earth station which is for periodically generating standard burst, each of said standard bursts defining a time division multiple access frame consisting of each of the standard bursts and a remaining part which comprises a first part for data bursts produced by said terrestrial and said standard earth stations and a second part, each of said terrestrial stations including communication devices for dealing with the data bursts of said terrestrial and the standard earth stations, said communication devices having a plurality of supervisory conditions which are to be monitored and which specify operational states of said communication device, the improvement wherein:

said each of the terrestrial stations comprises:

collecting means for collecting a set of state information signals representative of at least one of said operational conditions of the communication devices of said each of the terrestrial stations as a collected signal; and signal sending means responsive to said collected signal for sending said collected signal in the form of at least one significant word in a predetermined part which is selected in said second part with reference to each of said standard bursts and is common to said terrestrial stations;

said standard earth station comprising:

significant word extracting means for extracting the significant words sent from a selected one of said terrestrial stations as an extracted signal; and monitoring means responsive to said extracted signals for monitoring the state of operation of the communication devices of said selected one of the terrestrial stations.

11. A state information communicating system as claimed in claim 10, each of said terrestrial stations being assigned with a carrier wave selected from a plurality of carrier waves of different carrier frequencies, wherein:

said signal sending means of said each of said terrestrial stations is for making said assigned carrier wave convey said collected signal as said at least one significant word;

said at least one significant words being received by said standard earth station through a plurality of reception carrier waves of different frequencies;

said significant word extracting means being for periodically switching said reception carrier waves from one to another to extract said significant words for the respective terrestrial stations from the predetermined parts.

* * * * *